UNITED STATES PATENT OFFICE.

MAX BUCHNER, OF MANNHEIM, GERMANY.

MANUFACTURE OF CERAMIC PRODUCTS.

No. 853,341.   Specification of Letters Patent.   Patented May 14, 1907.

Application filed April 4, 1906. Serial No. 309,904.

*To all whom it may concern:*

Be it known that I, MAX BUCHNER, a citizen of the Empire of Germany, residing at Mannheim, in the Empire of Germany, have invented certain new and useful Improvements in the Manufacture of Ceramic Products; and I do hereby declare the following to be a full, clear, and exact description of the invention, such as will enable others skilled in the art to which it appertains to make and use the same.

Ordinary siliceous ceramic materials containing silica and silicates, such as sand, quartz and the various clays, undergo variable and indefinite changes in volume in firing in the kiln, an object made of such materials not having the same size or relative dimensions before and after firing and undergoing other changes with every successive firing. This property is the source of much inconvenience in endeavoring to make articles of exact dimensions, and also the source of much loss from warping and change of shape, expansion and contraction not always being equal in all directions. Quartz has a tendency to swell in the fire while pure clays usually contract, but these tendencies cannot be balanced very successfully by admixing since such mixtures do not have the expected intermediate properties, a fact probably due to molecular and chemical rearrangement of silicates in firing and re-firing. Expansion and contraction are uncertain quantities. I have discovered that fused alumina is exempt from this annoying variability and on this fact based the process of making ceramic wares for which I have received United States Letters-Patent No. 700,673, May 20, 1902. I have now discovered that similar valuable properties are possessed by fused aluminates such as are prepared by dissolving metallic oxids in fused alumina; certain of these aluminates being like the alumina itself invariable in volume in the porcelain kiln and others expanding and contracting definitely, making them valuable additions to ordinary ceramic materials. They are also valuable because of the extreme resistance offered by fused alumina to attack by chemical reagents, a resistance shared by the aluminates, making the new ceramic bodies useful for chemical apparatus and similar purposes. These new bodies may be prepared by melting natural or artificial alumina and adding the desired oxid to the molten alumina; or by mixing alumina with the oxids and fusing the mixture.

When the oxids are mixed in molecular proportions, the product is probably a true aluminate; when alumina or the oxid is in excess, a solid solution of the excess and the true aluminate is probably formed. For the sake of convenience in nomenclature, the products are hereinafter called aluminates irrespective of the particular proportions of alumina and other oxid. The products differ in color and physical properties with the nature of the oxid combined with the alumina. For instance an aluminate containing iron oxid has the property of expanding slightly in firing; one containing chromium oxid, contracts slightly. Those containing chromium oxid are very indifferent to heat, sudden changes in temperature, chemical reagents and the like. Aluminates containing titanium oxid, magnesia, baryta, etc., have slightly different but valuable properties.

The basic oxids used with the alumina to form aluminates may be employed singly or in mixture, and the proportions may be varied, obtaining products of any desired nature or properties. On incorporating such products with clay, kaolin and the like, plastic masses may be obtained which when fired in the usual way yield ceramic articles of excellent properties. Changes in volume of the articles may be regulated to any desired degree, which for articles to be glazed or to be of exact size is of great importance. In using the new bodies they may be simply mixed with the desired amount of other plastic ceramic material and water, molded or otherwise formed and fired in the usual way.

Having thus fully described the invention, what I claim as new and desire to secure by Letters-Patent of the United States, is:—

1. The process of making ceramic ware which consists in fusing together alumina and an oxid in proportions to form an aluminate, converting the fused aluminate into a shaped plastic mass and firing said mass.

2. As a new ceramic composition, a fused aluminate of a metallic oxid.

3. The process of making ceramic articles which consists in mixing a fused aluminate with a plastic material and firing the mixture.

4. The process of making ceramic articles which consists in mixing a fused aluminate with a clay and firing the mixture.

5. As a new article of manufacture, a ceramic article comprising a fused aluminate and a plastic material, fired together.

6. As a new article of manufacture, a ceramic article comprising a fused aluminate and a clay, fired together.

In testimony whereof I hereunto affix my signature in the presence of two witnesses.

MAX BUCHNER.

Witnesses:
H. W. HARRIS,
JOS. H. LEUTE.